US012690945B2

(12) United States Patent
Senff et al.

(10) Patent No.: US 12,690,945 B2
(45) Date of Patent: ***Jul. 28, 2026

(54) LIGHT GUIDE FOR ELECTRONIC DEVICE, SUCH AS ORAL IRRIGATOR

(71) Applicant: WATER PIK, INC., Fort Collins, CO (US)

(72) Inventors: Oscar C. Senff, Fort Collins, CO (US); Ryan Chase Kelley, Denver, CO (US)

(73) Assignee: WATER PIK, INC., Fort Collins, CO (US)

( * ) Notice: Subject to any disclaimer, the term of this patent is extended or adjusted under 35 U.S.C. 154(b) by 641 days.

This patent is subject to a terminal disclaimer.

(21) Appl. No.: 17/841,742

(22) Filed: Jun. 16, 2022

(65) Prior Publication Data

US 2022/0304772 A1 Sep. 29, 2022

Related U.S. Application Data

(62) Division of application No. 16/865,093, filed on May 1, 2020, now Pat. No. 11,389,270.

(51) Int. Cl.
| | |
|---|---|
| *A61C 1/08* | (2006.01) |
| *A61C 17/02* | (2006.01) |
| *F21V 3/04* | (2018.01) |
| *F21V 8/00* | (2006.01) |
| *H01H 13/02* | (2006.01) |
| *H01H 13/14* | (2006.01) |

(52) U.S. Cl.
CPC .......... *A61C 1/088* (2013.01); *A61C 17/0202* (2013.01); *F21V 3/049* (2013.01); *G02B 6/0001* (2013.01); *H01H 13/023* (2013.01); *H01H 13/14* (2013.01); *H01H 2219/062* (2013.01)

(58) Field of Classification Search
None
See application file for complete search history.

(56) References Cited

U.S. PATENT DOCUMENTS

| | | | | |
|---|---|---|---|---|
| 3,666,180 A | 5/1972 | Coombs | ............... | G02B 6/0005 |
| | | | | 362/573 |
| 4,141,352 A | 2/1979 | Ebner | .................. | A61C 1/0092 |
| | | | | 601/162 |
| 4,266,535 A | 5/1981 | Moret | .................. | A61B 1/0669 |
| | | | | 600/249 |
| 5,197,458 A | 3/1993 | Ito | .......................... | A61C 17/02 |
| | | | | 601/162 |
| 5,476,379 A | 12/1995 | Disel | ...................... | A61C 1/088 |
| | | | | 433/126 |

(Continued)

FOREIGN PATENT DOCUMENTS

| | | |
|---|---|---|
| CN | 2189167 | 2/1995 |
| CN | 102101609 | 6/2011 |

(Continued)

OTHER PUBLICATIONS

International Search Report and Written Opinion issued Aug. 7, 2020, in PCT Application No. PCT/US2020/019288, 16 pages.

*Primary Examiner* — Chris H Chu

(57) ABSTRACT

In one embodiment, a light guide includes an emitter and a light guide body optically coupled to the emitter. The light guide body may define a cylindrical body that tapers along an angled plane from a top end towards a bottom end. The bottom end may define a light entrance to the light guide body.

14 Claims, 10 Drawing Sheets

(56) References Cited

U.S. PATENT DOCUMENTS

| | | | |
|---|---|---|---|
| 5,799,126 A | 8/1998 | Nagatani | G02B 6/4298 |
| | | | 385/146 |
| 6,007,225 A | 12/1999 | Ramer | G02B 6/0006 |
| | | | 362/346 |
| 6,247,929 B1 | 6/2001 | Bachman | A61C 17/0202 |
| | | | 433/80 |
| 6,288,352 B1 | 9/2001 | Fukui | H01H 13/506 |
| | | | 200/1 R |
| 7,244,898 B2 | 7/2007 | Kim | H01H 13/83 |
| | | | 200/314 |
| D601,694 S | 10/2009 | Rocklin | D24/111 |
| 7,692,111 B1 | 4/2010 | Rosing | H01H 13/83 |
| | | | 200/310 |
| 8,356,207 B2 | 1/2013 | Hosek et al. | |
| 8,367,954 B2 | 2/2013 | Mao | H01H 13/023 |
| | | | 200/314 |
| D764,051 S | 8/2016 | Wang | D24/111 |
| 9,468,511 B2 | 10/2016 | Garrigues et al. | |
| 9,642,577 B1 | 5/2017 | Li et al. | |
| D796,028 S | 8/2017 | Senff | D24/111 |
| D797,278 S | 9/2017 | Uchida | D24/111 |
| D804,018 S | 11/2017 | Senff | D24/111 |
| D822,825 S | 7/2018 | Au | D24/111 |
| 10,010,389 B2 | 7/2018 | Boyd et al. | |
| 10,016,254 B2 | 7/2018 | Luettgen | |
| 10,022,207 B2 | 7/2018 | Taylor et al. | |
| D829,887 S | 10/2018 | Massie | D24/111 |
| D833,000 S | 11/2018 | Porter | D24/111 |
| D833,600 S | 11/2018 | Porter | D24/111 |
| D834,180 S | 11/2018 | Porter | D24/111 |
| 10,130,452 B2 | 11/2018 | Baragona et al. | |
| D839,409 S | 1/2019 | Massie | D24/111 |
| D840,022 S | 2/2019 | Porter | D24/111 |
| D840,023 S | 2/2019 | Massie | D24/111 |
| D843,549 S | 3/2019 | Thurgood | |
| D889,636 S | 7/2020 | Senff | D24/111 |
| D912,241 S | 3/2021 | Senff | D24/111 |
| D913,485 S | 3/2021 | Senff | D24/111 |
| 2006/0108210 A1* | 5/2006 | Katayama | H01H 13/023 |
| | | | 200/296 |
| 2007/0203439 A1 | 8/2007 | Boyd | A61C 17/028 |
| | | | 601/162 |
| 2009/0188780 A1 | 7/2009 | Watanabe | H01H 13/807 |
| | | | 200/5 A |
| 2010/0110722 A1 | 5/2010 | Sin | |
| 2010/0239998 A1 | 9/2010 | Snyder | A61C 19/06 |
| | | | 433/29 |
| 2011/0016721 A1* | 1/2011 | Schnak | H01H 13/023 |
| | | | 30/526 |
| 2011/0036693 A1 | 2/2011 | Lin | H01H 13/14 |
| | | | 200/314 |
| 2011/0070553 A1 | 3/2011 | Stempfle | A61C 1/088 |
| | | | 433/29 |
| 2012/0045730 A1 | 2/2012 | Sayder | A61L 2/0047 |
| | | | 433/29 |
| 2013/0101953 A1 | 4/2013 | Stone | A61B 1/24 |
| | | | 433/29 |
| 2014/0063836 A1 | 3/2014 | Chiang | G02B 19/0052 |
| | | | 362/553 |
| 2014/0272782 A1 | 9/2014 | Luettgen | A61C 1/0015 |
| | | | 433/80 |
| 2014/0328067 A1 | 11/2014 | Chu | F21V 7/005 |
| | | | 362/346 |
| 2015/0147717 A1 | 5/2015 | Taylor | A61C 17/0202 |
| | | | 433/80 |
| 2015/0173850 A1 | 6/2015 | Garrigues | A61C 1/0092 |
| | | | 433/80 |
| 2015/0182319 A1 | 7/2015 | Wagner | A61C 17/0202 |
| | | | 132/308 |
| 2015/0323729 A1* | 11/2015 | Takatori | G02F 1/133603 |
| | | | 362/606 |
| 2015/0332872 A1 | 11/2015 | Konishi | H01H 13/023 |
| | | | 200/314 |
| 2017/0045666 A1 | 2/2017 | Vasylyev | G02B 6/0068 |
| 2017/0052436 A1 | 2/2017 | Xian | F21S 10/005 |
| 2017/0056142 A1 | 3/2017 | Baragona et al. | |
| 2017/0209234 A1 | 7/2017 | Senff | A61H 13/005 |
| 2017/0252251 A1 | 9/2017 | Williams | A61H 13/005 |
| 2018/0000557 A1 | 1/2018 | Brandstaetter | A61C 17/20 |
| 2018/0140298 A1 | 5/2018 | Farascioni | |
| 2018/0140399 A1 | 5/2018 | Hoshino et al. | |
| 2018/0140400 A1 | 5/2018 | Toshino et al. | |
| 2018/0140401 A1 | 5/2018 | Hoshino et al. | |
| 2018/0153644 A1 | 6/2018 | Bosisio et al. | |
| 2018/0168332 A1 | 6/2018 | Wagner | H05B 47/16 |
| 2018/0168784 A1 | 6/2018 | Wagner | A61C 17/0202 |
| 2018/0168785 A1 | 6/2018 | Wagner | A61C 17/0217 |
| 2018/0256300 A1 | 9/2018 | Hoshino et al. | |
| 2020/0268494 A1 | 8/2020 | Senff | |
| 2021/0213766 A1 | 7/2021 | Lim | G09F 13/04 |

FOREIGN PATENT DOCUMENTS

| | | | |
|---|---|---|---|
| CN | 202776618 | 3/2013 | |
| CN | 105338924 | 2/2016 | |
| CN | 105640662 A | 6/2016 | A61C 17/02 |
| CN | 106890033 A | 6/2017 | A61C 17/02 |
| CN | 108618861 A | 10/2018 | A61C 17/02 |
| CN | 109009523 | 12/2018 | |
| DE | 3936714 A1 | 5/1991 | A61C 1/088 |
| DE | 10356483 B4 * | 3/2007 | B60Q 1/2665 |
| EP | 1050711 A1 * | 11/2000 | G02B 6/0018 |
| EP | 2229917 A1 | 9/2010 | A46B 15/0044 |
| EP | 3323381 A1 | 5/2018 | A61C 17/0202 |
| EP | 3323382 A1 | 5/2018 | B05B 11/30 |
| EP | 3323383 A1 | 5/2018 | A61C 17/0202 |
| EP | 3323384 A1 | 5/2018 | A61C 17/227 |
| EP | 3357454 A1 | 8/2018 | A61C 17/0202 |
| EP | 3372195 A1 | 9/2018 | A61C 17/0202 |
| JP | 2018073458 A | 5/2018 | H01H 11/0018 |
| KR | 20080055789 | 6/2008 | |
| KR | 20120004128 U | 6/2012 | |
| KR | 20150025688 A | 3/2015 | |
| KR | 20180110421 | 10/2018 | |
| TW | 200829123 A | 7/2008 | G02B 6/0088 |
| WO | WO-2006074525 A1 | 7/2006 | A61C 19/003 |
| WO | WO-2010021284 A1 | 2/2010 | A61C 17/02 |
| WO | WO-2015173691 A1 | 11/2015 | A61C 17/028 |
| WO | WO-2016108149 A1 | 7/2016 | H02J 7/0044 |
| WO | WO-2017046945 A1 | 3/2017 | G09F 13/18 |
| WO | 2018112387 | 6/2018 | |
| WO | 2020/172568 A1 | 8/2020 | |

* cited by examiner

LIGHT GUIDE FOR ELECTRONIC DEVICE, SUCH AS ORAL IRRIGATOR

CROSS REFERENCE TO RELATED APPLICATION

This application is a divisional of U.S. patent application Ser. No. 16/865,093 filed May 1, 2020, which is hereby incorporated by reference herein in its entirety.

TECHNICAL FIELD

The present disclosure relates generally to a button assembly for an electronic device, such as an oral irrigator.

BACKGROUND

Electronic devices, such as electric toothbrushes and oral irrigators, typically utilize control buttons, such as power buttons, mode buttons, or the like, that allow a user to provide input to the device. Many electronic devices are used in wet environments, such as bathrooms, thereby providing risk of water or other fluid damage. Often, control buttons, especially ones that move relative to a housing, may be an entry point for water, which can damage the electronic device.

To help a user identify a desired button more readily (e.g., in low light environments), assist in providing an aesthetic effect, or indicate an operating mode of the electronic device, for example, a light may be associated with the button. Traditional lights often include "hot spots", rather than providing a blended and diffused lighting effect.

SUMMARY

According to one or more embodiments of the present disclosure, an oral irrigator is disclosed. The oral irrigator includes a reservoir, a base that supports the reservoir, and a button assembly coupled to the base and configured to provide an input to the baes. The button assembly includes a button movable between an original position and an actuation position, a spring coupled to the button and configured to deform in response to a user input force moving the button from the original position to the actuation position, and to resiliently return the button to the original position in response to cessation of the user input force on the button, and a seal coupled to the spring, the seal inhibiting fluid from entering through the spring into the base.

According to one or more embodiments of the present disclosure, a light guide is disclosed. The light guide may include an emitter and a light guide body optically coupled to the emitter. The light guide body may define a cylindrical body that tapers along an angled plane from a top end towards a bottom end, the bottom end defining a light entrance to the light guide body.

According to one or more embodiments of the present disclosure, an oral irrigator is disclosed. The oral irrigator includes a reservoir, a base configured to support the reservoir, and a button assembly connected to the base. The button assembly may include a button and a light guide coupled to the button, where the light guide includes an emitter surrounding a perimeter of the button and a light guide in optical communication with a light source and with the emitter.

According to one or more embodiments of the present disclosure, a waterproof button assembly for electronic devices is disclosed. The button assembly may include a button, a spring positioned beneath and including a portion spanning a width of the button, a seal overmolded to the spring to prevent water ingress below the spring, and an actuator formed integrally with the spring and configured to change a state of a switch as the button moves from a first position to a second position.

Additional features are set forth in part in the description that follows and will become apparent to those skilled in the art upon examination of the specification and drawings or may be learned by the practice of the disclosed subject matter. A further understanding of the nature and advantages of the present disclosure may be realized by reference to the remaining portions of the specification and the drawings, which forms a part of this disclosure.

One of skill in the art will understand that each of the various aspects and features of the disclosure may advantageously be used separately in some instances, or in combination with other aspects and features of the disclosure in other instances. Accordingly, individual aspects can be claimed separately or in combination with other aspects and features. Thus, the present disclosure is merely exemplary in nature and is in no way intended to limit the claimed invention or its applications or uses. It is to be understood that structural and/or logical changes may be made without departing from the spirit and scope of the present disclosure.

The present disclosure is set forth in various levels of detail and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. Moreover, for the purposes of clarity, detailed descriptions of certain features will not be discussed when they would be apparent to those with skill in the art so as not to obscure the description of the present disclosure. The claimed subject matter is not necessarily limited to the arrangements illustrated herein, with the scope of the present disclosure is defined only by the appended claims.

BRIEF DESCRIPTION OF THE DRAWINGS

The description will be more fully understood with reference to the following figures in which components may not be drawn to scale, which are presented as various embodiments, and should not be construed as a complete depiction of the scope of the description.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
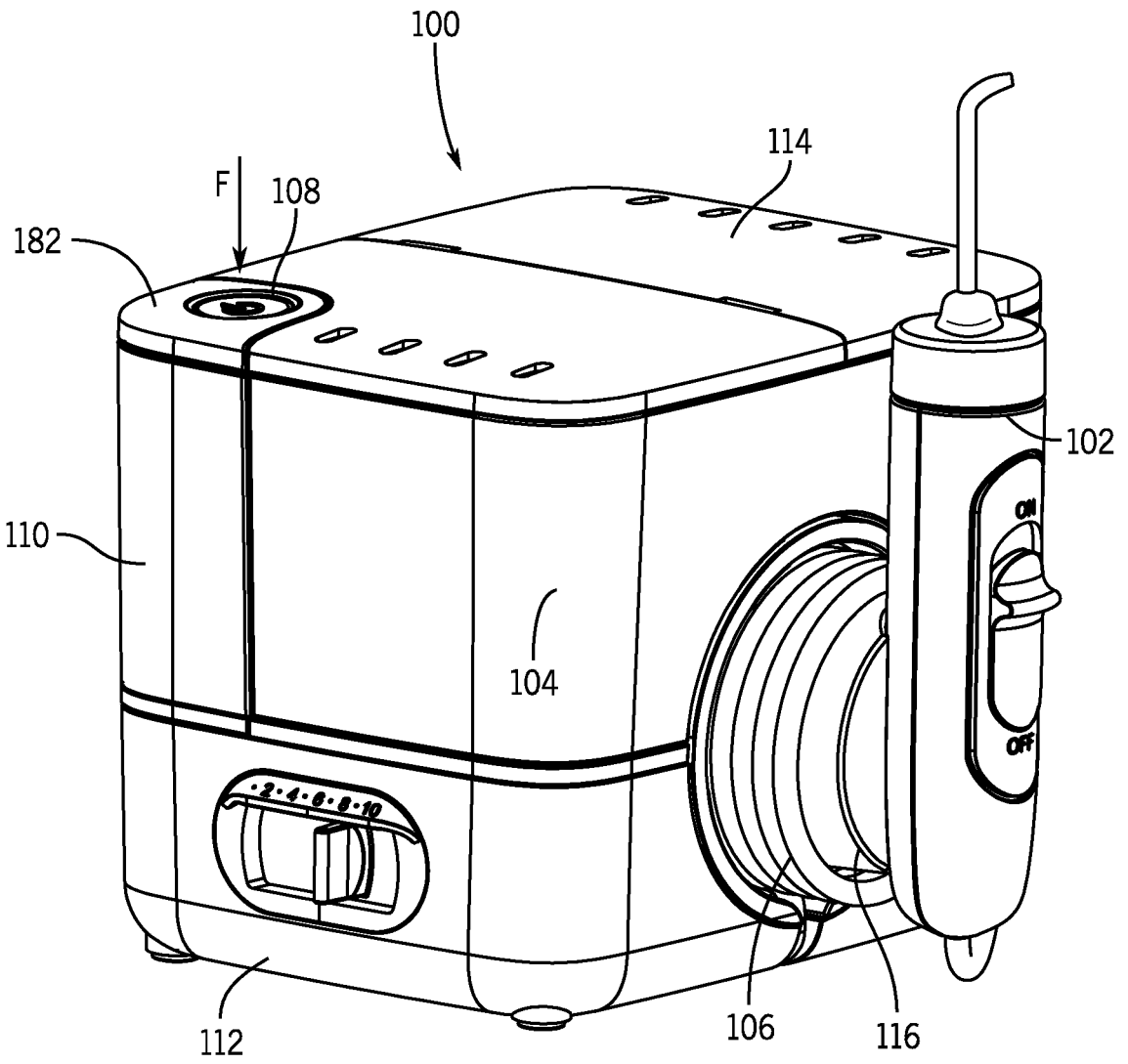
FIG. 1 is a front left perspective view of an oral irrigator including a button assembly.

According to the present disclosure, a button assembly for an electronic device, such as oral heath devices (e.g., oral irrigators, toothbrushes, combination units, etc.) is disclosed. In one embodiment, the button assembly is waterproof or otherwise sealed to prevent water ingress. For example, the button assembly may be formed as part of an oral health device (e.g., oral irrigator or toothbrush) that may be used in wet environments, such as bathrooms, and the waterproof features help to prevent damage to the device from water entering into the device and damaging electrical components. In one embodiment, the button assembly includes an integrated spring that spans beneath a button or other user engagement surface of the button assembly. A waterproof impermeable material, such as rubber or the like, may be connected to the spring to define a liquid-tight barrier and prevent liquid (e.g., water) from passing around the button and into the interior of the electronic device.

The button assembly may include a light source, such as one or more light emitting diodes (LEDs), and a light pipe or guide (used interchangeably herein) in optical commination with the light source. The light pipe or light guide has a curved shape with cutouts or openings in one or more sidewalls that help to uniformly reflect and distribute light from the light source to illuminate an output or emitter area of the light pipe (e.g., surfaces viewable by a user). Additionally, the light guide may include varied material textures to further assist in improving the uniformity of the emitted light from a perspective of the viewer. In one embodiment, the light pipe may include a lower region having a smooth texture and an upper region, adjacent to and forming the viewable surface, that has a rough texture (e.g., sandblasted surface). The transition from smooth to textured surfaces adjacent to the viewable surface helps to ensure better brightness and hue uniformity over different viewing angles, as well as improve the blending of the light, to reduce the appearance of "hot spots" and generate a desired aesthetic appearance. In one embodiment, the light pipe may also include a tapered and angled body that helps to direct more light to areas of the light pipe positioned away from the light source, helping ensuring uniform emission.

As a specific example, the button assembly may include one or more of a button, a light guide, a spring, an actuator, or a seal. In this example, as the user compresses the button, the spring deforms, allowing the actuator to move in response to the user force to activate a switch or other electrical control, while the seal prevents fluid ingress (even as the actuator is moved). As the user releases or reduces the force on the button (e.g., stops pushing down), the spring returns to its original shape, moving the actuator and the seal back to their original positions. The light guide defines a light feature around and/or through the button. In some instances, the light guide, the actuator, the seal, and the spring are formed as a unitary component. The seal may be formed via an overmolding process, which may enhance the lifespan of the components and reduce the manufacturing cost by reducing the number of parts required for the button assembly.

Figure 2:
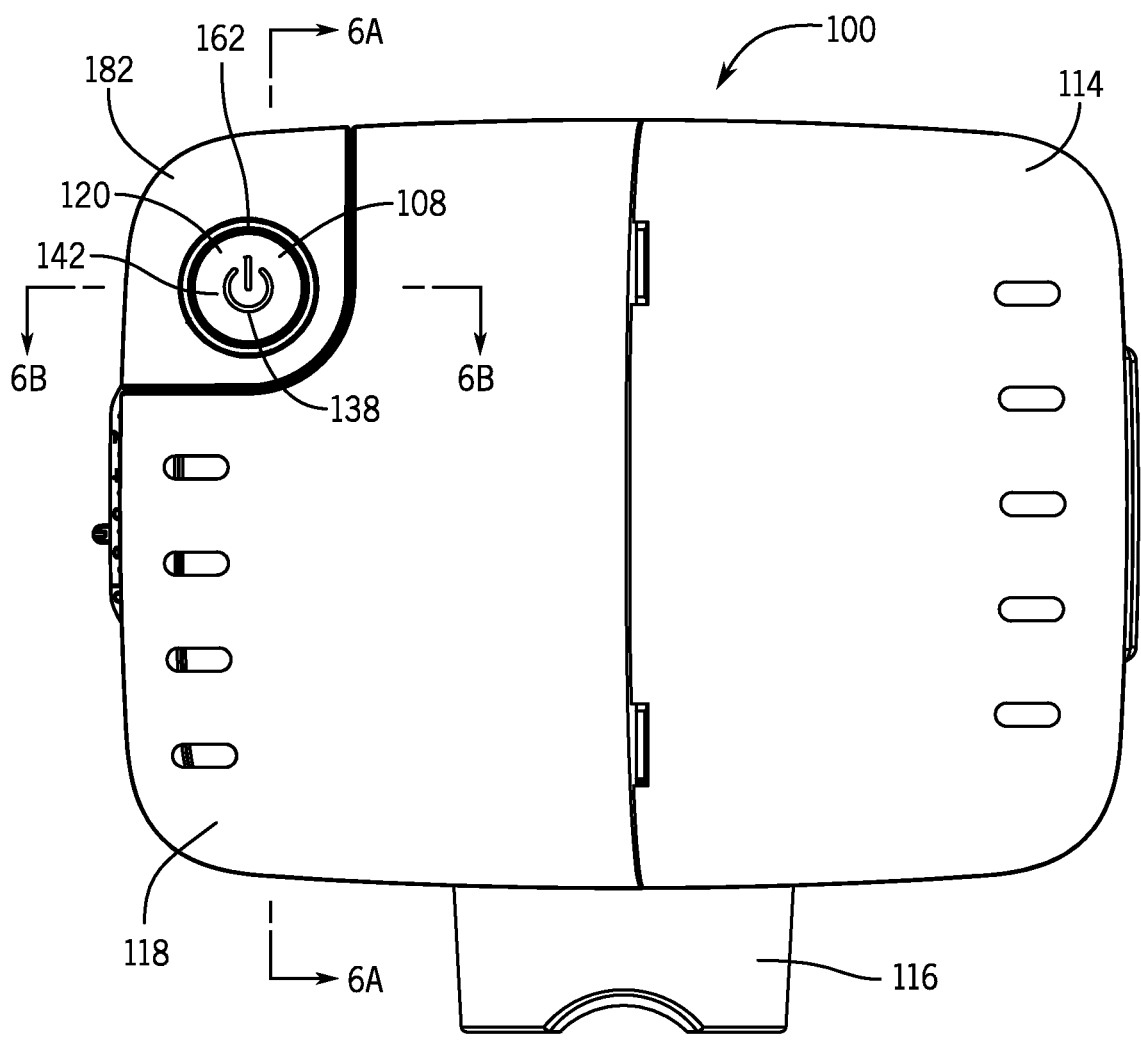
FIG. 2 is a top plan view of the oral irrigator of FIG. 1.
Figure 3:
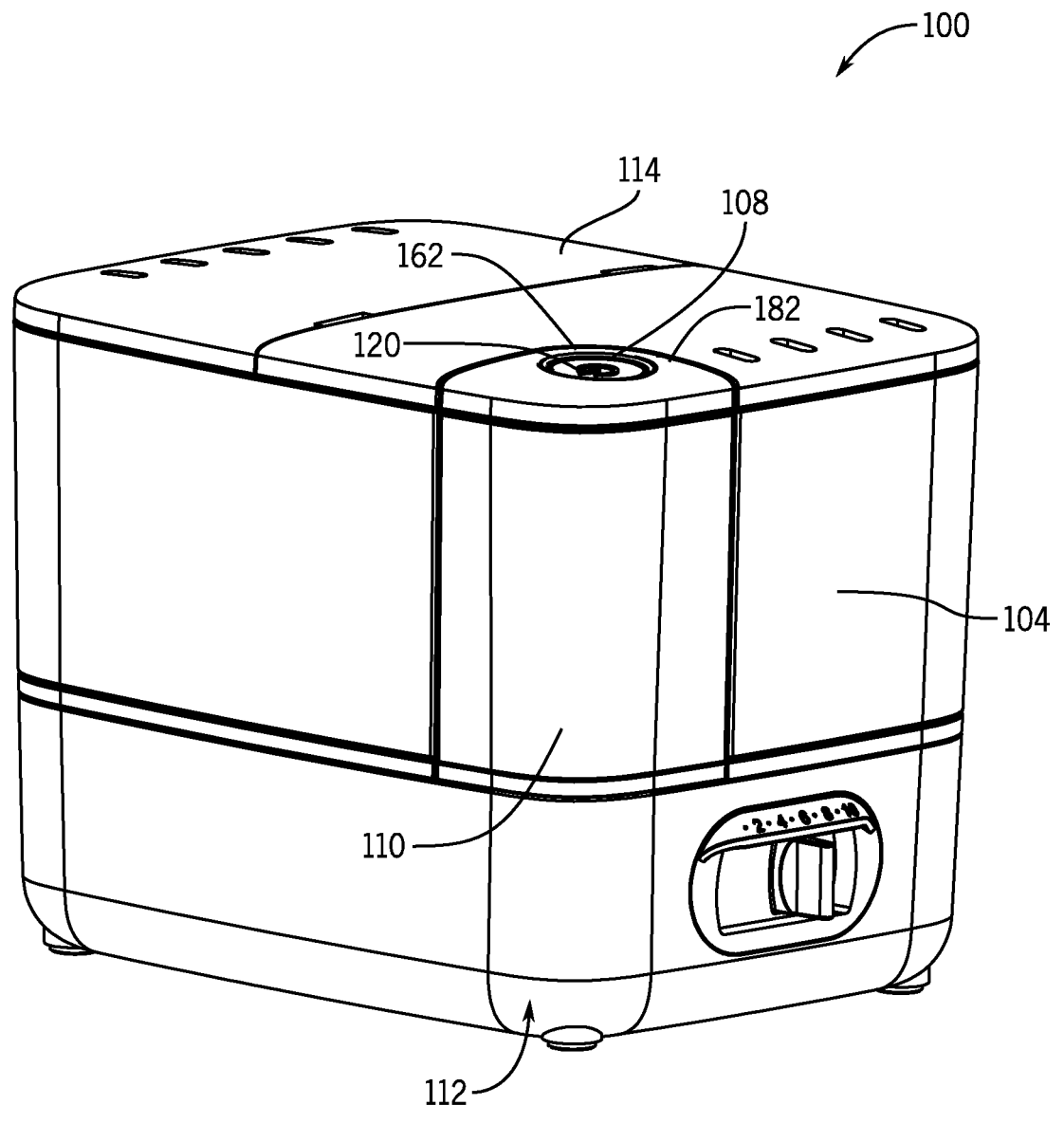
FIG. 3 is a rear left perspective view of the oral irrigator of FIG. 1.

FIGS. 1-3 show various views of an example electronic device, namely an oral irrigator 100, including a button assembly 108. The oral irrigator 100 may include a handle 102, a reservoir 104 fluidly coupled to the handle 102 by a hose 106 and a base 112 supporting the reservoir 104 and the handle 102. In the embodiment shown in FIG. 1, the button assembly 108 is actuatable from a top surface 118 of the oral irrigator 100 and includes a riser 110 or button housing that may define a compartment for the button assembly 108 as it extends from the base 112 to the top surface of the oral irrigator 100. An example of the reservoir 104 and riser 110 can be found in U.S. patent application Ser. No. 16/797,621, entitled "Countertop Water Flosser," filed on 21 Feb. 2020 and incorporated herein for all purposes. The riser 110 may be coupled to the base 112 and may include a riser cover 182 that encloses a riser cavity 184. The riser cover 182 may define a top surface of the riser and may extend and form a part of the top surface 118 of the oral irrigator 100.

The handle 102 acts to deliver fluid stored in the reservoir to a user's oral cavity and may include a jet tip or other tip to direct the fluid stream in a particular direction. The handle 102 may be coupled to the base 112 via a holder 116 and may be fluidly coupled to the reservoir 104 via the hose 106. The base 112 acts as a housing for the oral irrigator 100 and houses various components, such as a pump, motor, and the like, that are used to deliver fluid from the reservoir 104 to the handle 102. In some instances, the reservoir 104 sits on the top surface of the base 112 and may include a lid 114 to cover the interior fluid compartment. The reservoir 104 may be removable from the base 112, e.g., to assist a user in filling the reservoir 104. Similarly, the lid 114 may include hinges or otherwise be pivotable from a closed to an open position to allow a user to access the interior fluid compartment to fill the reservoir 104.

Figure 4:
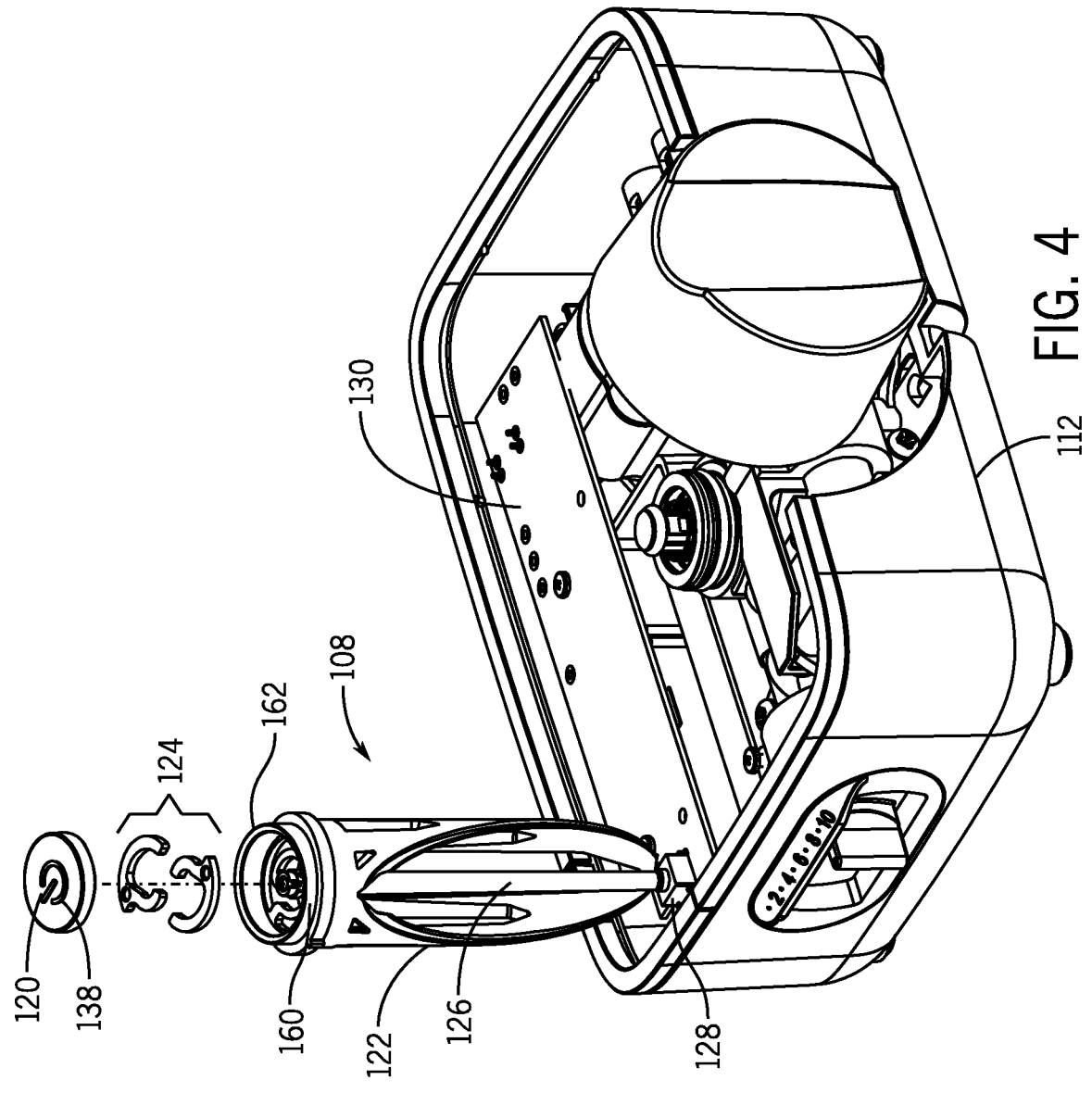
FIG. 4 is a perspective view of the oral irrigator of FIG. 1 with the reservoir and other components hidden for clarity and the button assembly exploded.
Figure 6A:
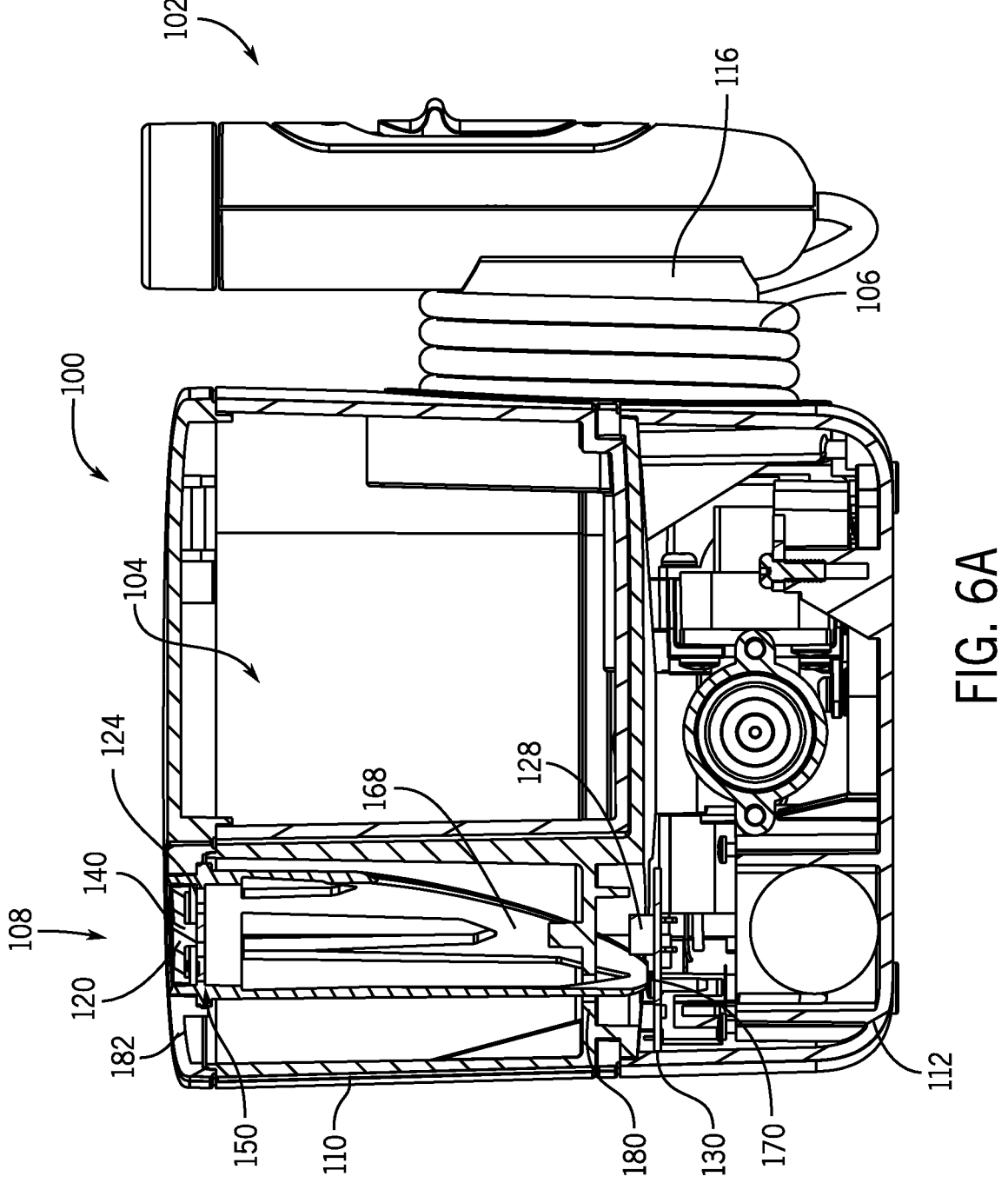
FIG. 6A is a cross-section view of the oral irrigator taken along line 6A-6A in FIG. 2.
Figure 6B:
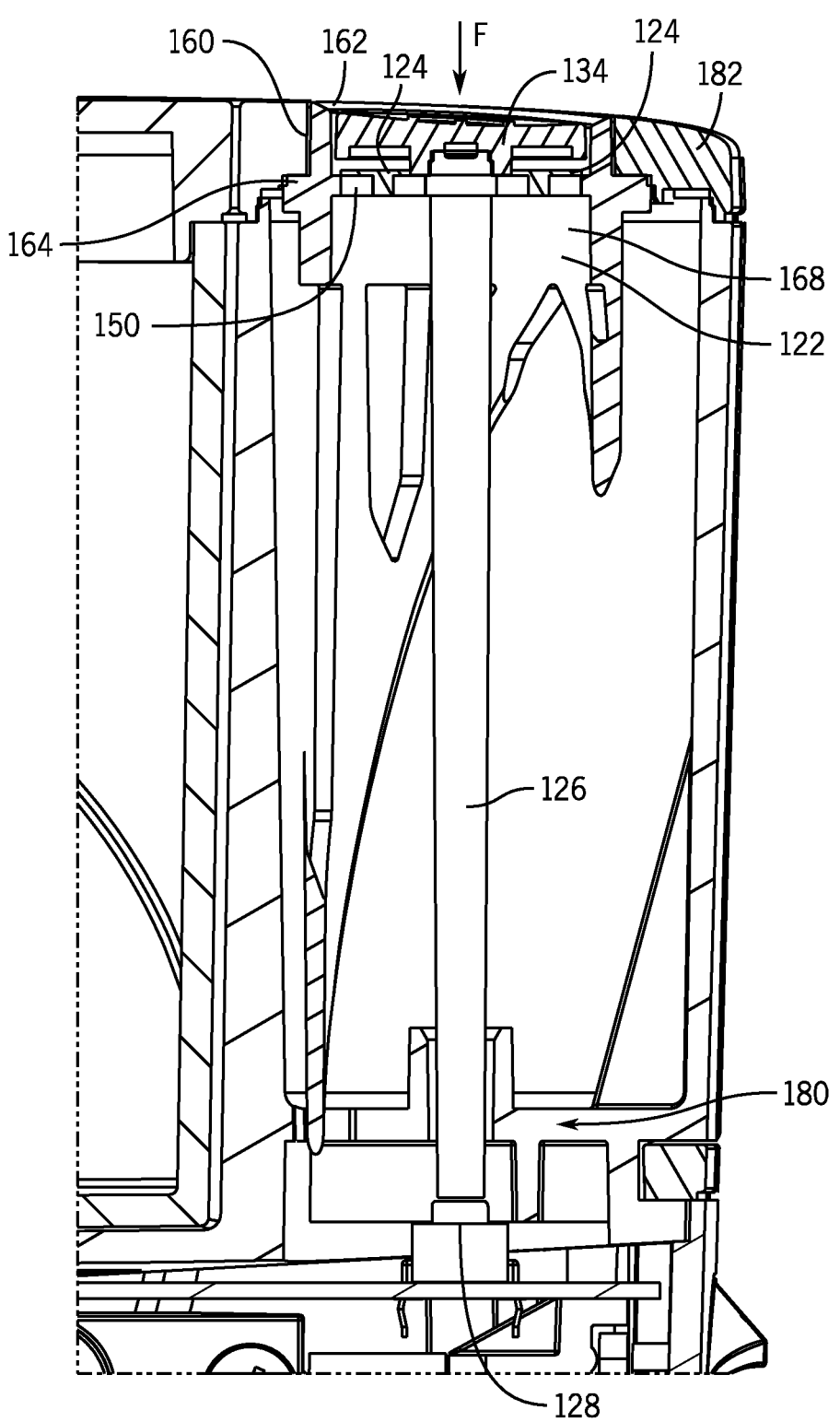
FIG. 6B is a cross-section view of the oral irrigator taken along line 6B-6B in FIG. 2.

FIG. 4 illustrates the oral irrigator 100 with certain elements hidden. FIGS. 6A and 6B illustrate various cross-section views of the oral irrigator 100. With reference to FIG. 4 and FIGS. 6A and 6B, the button assembly 108 may actuate a switch 128, which may be supported or electrically connected to a circuit board 130 positioned within the base 112.

The button assembly 108 may include a button 120. The button 120 may form an exterior surface of the button assembly 108 and be configured to be pressed or otherwise engaged by the user. The button 120 may include a top surface 142 that is pressed on by the user. The top surface 142 may be sloped or angled to match a curvature of a top surface of the riser 110 and/or lid 114 and/or to assist a user actuating the button assembly 108 at a desired location. For example, the top surface 142 may be sloped towards a center of the button 120 to provide an appealing aesthetic appearance, as well as assist a user in actuating the button 120 at a center thereof.

An icon 138, e.g., power icon, or other glyph, may be defined on the top surface 142. In some embodiments, the icon 138 may be etched into the top surface 142. In other embodiments, the icon 138 may be printed, defined, or otherwise attached to the top surface 142. As can be understood, the icon 138 may be flush with the top surface 142, recessed from the top surface 142, or raised above the top surface 142, depending on the desired configuration of the button assembly 108. Additionally, in some instances, the icon 138 may be configured to allow light to be transmitted therethrough, whereas the remaining portions of the button 120 may be opaque. For example, the icon 138 may be defined by a first color or having a first light transmissive characteristic (e.g., clear or translucent) and the remaining sections of the button 120 may be defined by a second color or having a second light transmissive characteristic (e.g., opaque).

Figures 7A, 7B:
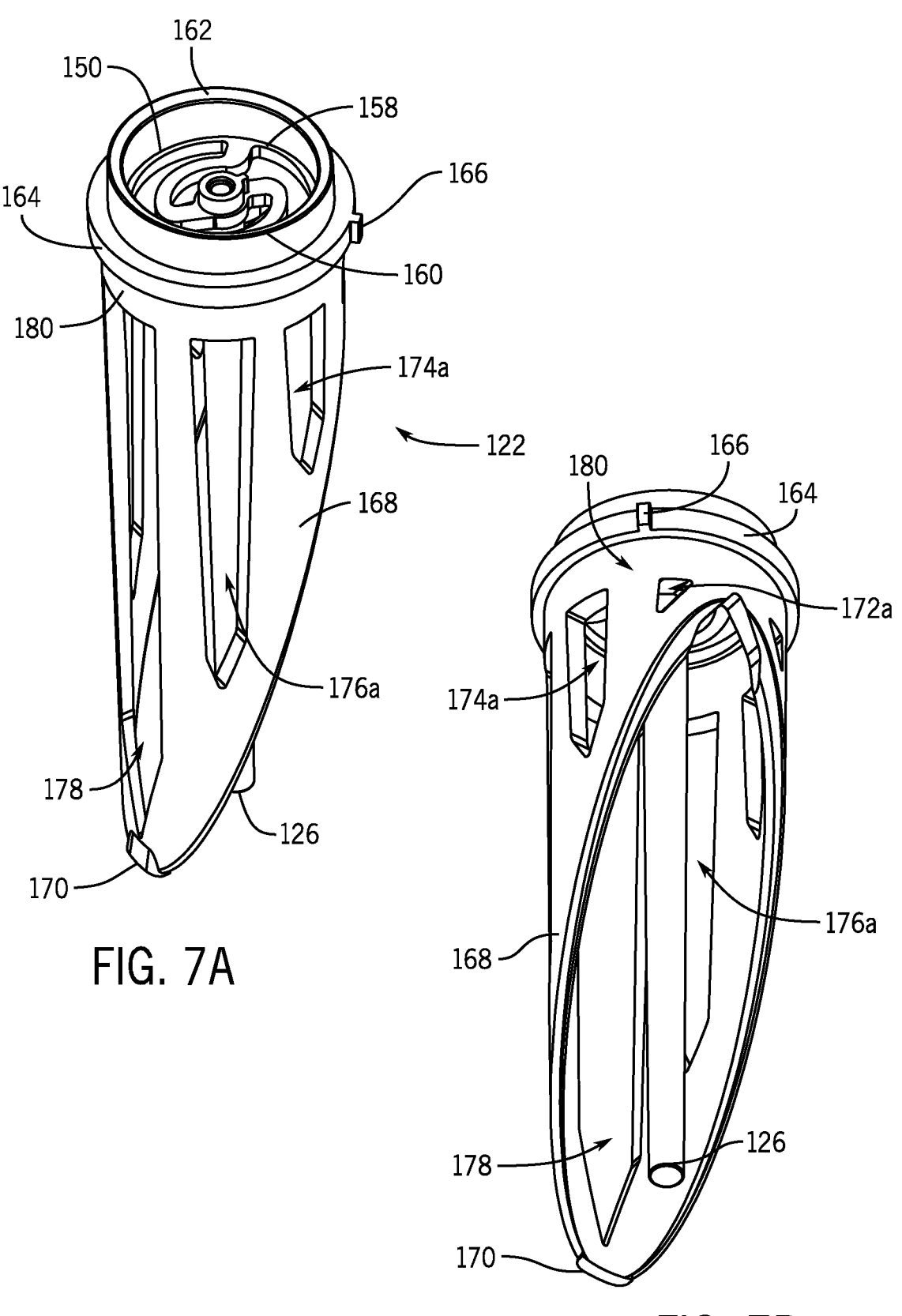
FIG. 7A is a top perspective view of a light guide of the button assembly.
FIG. 7B is a bottom perspective view of the light guide of FIG. 7A.

The button assembly 108 may include an actuator 126. The actuator 126 may be coupled to the button 120. For example, the actuator 126 may be coupled to a bottom surface of the button 120. In some implementations, a connection barrel 134 may extend from the bottom surface of the button 120 and define a connection cavity 140 for receipt of a top portion of the actuator 126. The connection barrel 134 may include one or more keying elements, e.g., recesses or cutouts, configured to key with the actuator 126. In some embodiments, the button is ultrasonically welded to the actuator 126. With reference to FIGS. 6B and 7B, the actuator 126 may be a shaft or rod coupled to the button 120, such that movement of the button 120 causes the actuator 126 to move therewith.

The button assembly 108 may include a seal 124. With reference to FIG. 4, the seal 124 prevents water ingress in or around the button 120 and into the base 112. The seal 124 may be positioned beneath the button 120. The seal 124 may be formed of a water impermeable material, such as rubber, or the like.

Figures 7C, 7D:
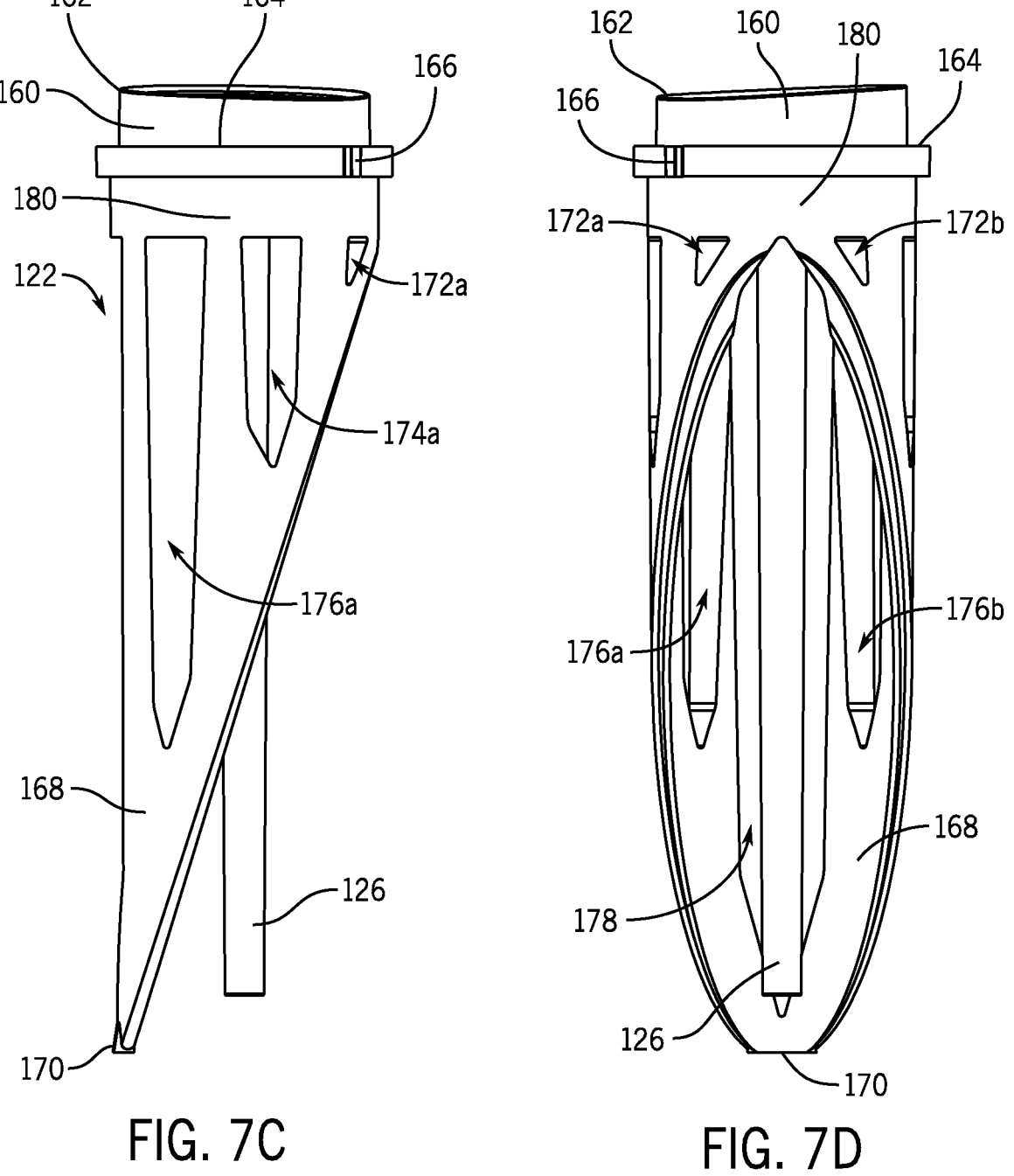
FIG. 7C is a side elevation view of the light guide of FIG. 7A.
FIG. 7D is front elevation view of the light guide of FIG. 7A.
Figure 7E:
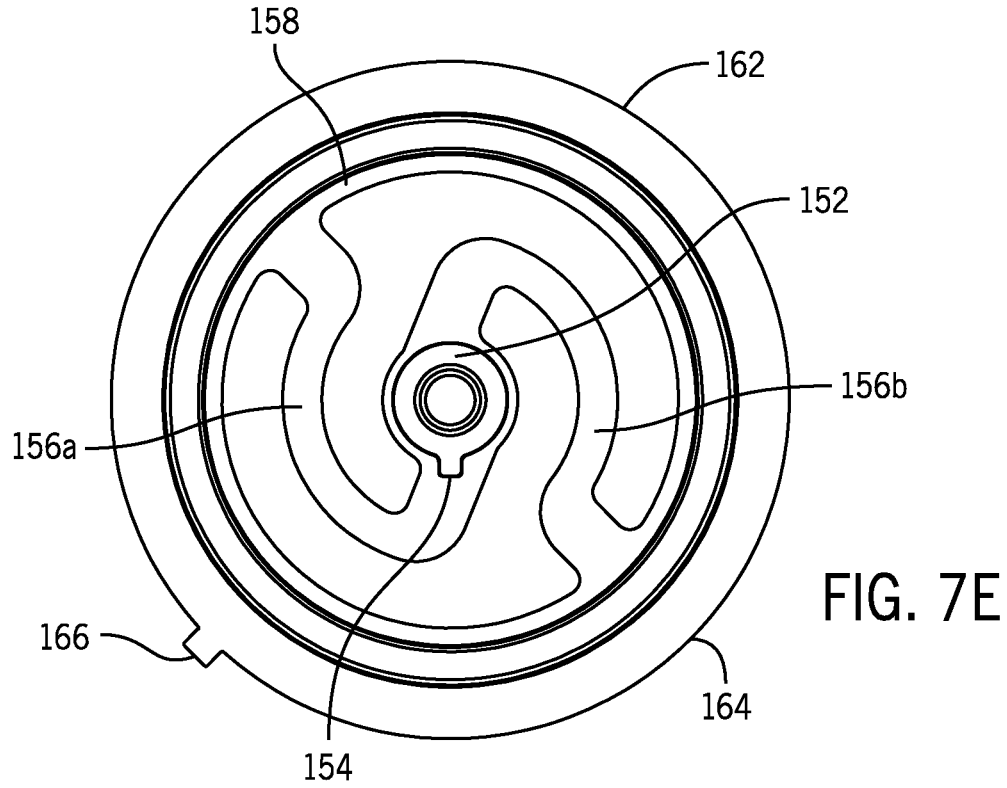
FIG. 7E is a top plan view of the light guide of FIG. 7A.
Figure 7F:
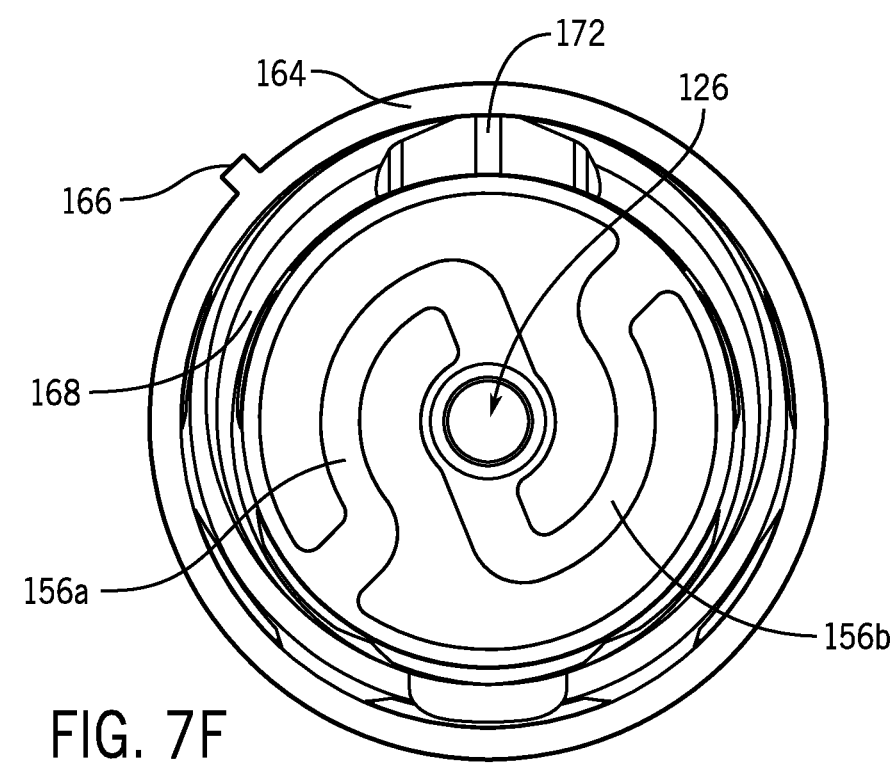
FIG. 7F is a bottom plan view of the light guide of FIG. 7A.

The button assembly 108 may include a spring 150. The spring 150 allows the button 120 to move from a first position to a second position in response to a user motion, e.g., a user force F (see FIG. 1), and return to the first position. With reference to FIG. 7E, the spring 150 may include a spring body 158 and include two spring arms 156a, 156b extending inwards from the spring body 158 to meet with one another at a center area of the spring body 158. The spring arms 156a, 156b may be defined as partially arcuate members with connecting straight members that connect the spring arms 156a, 156b at a first location to the spring body 158 and at a second location to each other at the center area of the spring body 158. However, the spring arms 156a, 156b may be formed in other manners that define a flexibility, e.g., the ability to deform in response to a user force F and return to an undeformed position. The spring arms 156a, 156b may span across the width of the spring body 158.

With continued reference to FIG. 7E, a button attachment shaft 152 may extend upwards from a center of the spring 150. For example, the button attachment shaft 152 may extend upwards from the center or connection location of the two spring arms 156a, 156b. The button attachment shaft 152 may be defined as a cylindrical shaft and may include a keying feature 154, such as a keying tab, that extends from one or more locations, in order to key to the button 120.

The seal 124 may be attached to the spring 150. For example, the seal 124 may be overmolded onto the spring 150 to inhibit fluid passage through or around the spring 150. In some embodiments, the seal 124 may be a separate element coupled (e.g., ultrasonically welded) to the button assembly 108. The seal 124 may be disposed in the same plane as the spring 150. The seal 124 may be formed of a thermoplastic elastomer.

The button assembly 108 may include a light guide 122. With reference to FIG. 7A, the light guide 122 includes a body 168 defining an optical path from a light input or entrance 170 to a light output or emitter 162. The bottom end or light entrance 170 may be positioned on a first side of the light guide 122. It should be noted that the configuration of the light guide 122 may be selected based on optical properties, as well as aesthetic properties to provide an aesthetically pleasing appearance. The emitter 162 or light exit surface may define a top surface of the light guide 122. In some instances, the emitter 162 may be defined as a beveled or angled surface that has a shape corresponding to the shape of the button 120. For example, in implementations with a circular button 120, the emitter 162 may have a circular shape. The emitter 162 may form a border around the button 120 and emit light around the periphery of the button 120. With reference to FIGS. 7C and 7D, the light guide 122 may include a wall or shroud 160 that extends downwards from the emitter 162. The wall 160 may surround the sides of the button 120 such that only the top surface 142 of the button 120 is exposed to the user. In some embodiments, the wall 160 may have a varying height, e.g., a front portion of the wall 160 may extend higher than a rear portion. The height differential may be selected to match a corresponding curvature or topography of a top surface of the riser cover 182 and/or the top surface 118 of the oral irrigator 100.

The light guide 122 may be suspended from an upper surface of the oral irrigator 100. With reference to FIGS. 6B-7F, an annular rib 164 may extend outwards from an outer surface of the wall 160. The annular rib 164 may be supported by the riser 110, the riser cap 182, or the lid 114 of the oral irrigator 100, for example, such that the light guide 122 extends downward therefrom. In some embodiments in which the button 120 has a circular shape, the annular rib 164 may have a diameter larger than the extension wall 160. One or more tabs 166 may extend outwards from the annular rib 164 to ensure the light guide 122 is properly oriented and aligned with a light source inside the oral irrigator 100. The one or more tabs 166 may be defined as one or more longitudinal tabs extending along a height of the annular rib 164, i.e., parallel to a longitudinal axis of the light guide 122.

With reference to FIGS. 7A-7D, the light guide body 168 extends downward from the wall 160 and the annular rib 164. The light guide body 168 may be defined as a curved wall that terminates at varying lengths along its bottommost perimeter. For example, the body 168 may be defined as a cylinder with an angular planar edge defined along a range between 40 to 70 degrees and in some instances may transition from an angle of 63 degrees at the bottommost end of the body 168 to 65 degrees as the body extends longitudinally towards the top end. The shape and angle of the body 168 is selected to maximize total internal reflection of light from the light source within the light guide, as well as to direct light from the light source 186 towards an opposite side of the light guide 122, ensuring uniform illumination. A portion of the body 168 extends and tapers along the entire length of the light guide 122 to define a terminal end at the light entrance 170. From the light entrance 170 upwards, the body 168 extends outwards along a cylindrical perimeter and upwards towards the wall 160 and the annular rib 164.

With reference to FIG. 7C, in one embodiment, the light guide body 168 transitions from the annular rib 164 as a full cylindrical wall defining a transition portion 180. The transition portion 180 extends around the entire perimeter of the light guide 122 and is aligned with the emitter 162, to direct light uniformly from the body 168 to all areas of the emitter 162. From the transition portion 180, the light guide body 168 tapers along the angled plane towards the bottom end defining the light entrance 170. In one embodiment, the light entrance 170 is positioned on a first side of the light guide 122 and is opposite side (e.g., second side) of the light guide 122 from a highest terminal end of the light guide body 168.

The light guide body 168 includes a plurality of distribution cutouts or openings defined and positioned to more uniformly transfer light to the transition portion 180. The plurality of distribution cutouts may be configured to define different emission areas within the light guide body 168, where the emission areas are more emissive or larger further from the light entrance 170 and are less emissive or smaller closer to the light entrance 170, which helps to ensure that sufficient light is directed further from the light entrance 170 to uniformly emit from the emitter 162.

With reference to FIG. 7D, in one embodiment, a first pair of distribution cutouts 172a, 172b are defined as triangular shaped cutouts each with two vertices arranged parallel to a bottom edge of the transition portion 180. A second pair of distribution cutouts 174a, 174b are defined as rectangular cutouts that transition to a point, such as V-shape, at a bottom end. These second distribution cutouts 174a, 174b are positioned adjacent to a first distribution cutout from the first pair of distribution cutouts 172a, 127b and are larger is size than the first pair of distribution cutouts 172a, 172b. A third pair of distribution cutouts 176a, 176b has a shape similar to the second pair of distribution cutouts 174a, 174b, but with a longer length and size and being positioned adjacent to one of the second pair of distribution cutouts 174a, 174b. A fourth distribution cutout 178 is formed of a single cutout, rather than a pair, and separates the various pairs from one another. The fourth distribution cutout 178 may have a similar shape as the second pair of distribution cutouts 174a, 174b and the third pair of distribution cutouts 176a, 176b, but with a longer length and size than any either distribution cutout. The fourth distribution cutout 178 may include a pointed end positioned above and aligned with the light entrance 170 such that light emitted from the light source 186 is split and then directed (ultimately after traveling through the body 168) to different halves of the emitter 162, ensuring that the all sides of the emitter 162 are illuminated, even though the light source 186 may be physically aligned with only a first portion or half of the emitter 162.

In one embodiment, the light guide body 168 may have seven separate distribution cutouts distributed along the body 168 apart from one another. In one implementation, each of the distribution cutouts start at the same location near the wall 160, such as at a terminal end of the transition portion 180, but extend at varying lengths along the length of the body 168. In some embodiments, the bottom ends of the distribution cutouts 172a, 172b, 174a, 174b, 176a, 176b, 178 may be formed with a V-shape or otherwise taper towards a pointed end that faces downward (i.e., in a direction towards the light source 186. This tapered shape helps to intercept the light and pull the light upwards, i.e., towards a top end of the light guide body 168.

The distribution cutouts are larger in size closer to and on the same side as the light source 186 and are smaller in size as further from the light source 186. In this manner, the light guide body 168 defines larger light emission sections further from the light entrance 170 and smaller emission sections closer to the light entrance 170, which helps to ensure that the light is balanced across the emitter 162, even though the light may originate at a single light entrance 170. The distribution cutouts 172a, 172b, 174a, 174b, 176a, 176b, 178 may be shaped to collect portion of light emitted from the light source and direct that portion towards the emitter 162. In this manner, the light guide 122 distributes the light emitted from the light source as received at the light entrance 170 and uniformly distributes the light around and into the emitter 162.

The light guide 122 may be formed of a material that allows light transmission therethrough, as well as helps to diffuse and distribute the light. In one example, the light guide 122 may be formed of a clear or other transmissive plastic. In some embodiments, the light guide 122 may having varying textures or surface treatments at different locations to distribute the light as the light approaches the emitter 162. As one example, an outer surface of the emitter 162, the extension wall 160, and optionally the transition portion 180, may be textured, such as by molding a texture into the material (e.g., MT-11006), applying a treatment (e.g., sandblasting), or the like. The remaining portions of the light guide 122 may remain smooth or otherwise not-treated such that the light guide 122 may have texture variation in outer surface properties to assist in improving the uniformity and blending of light as emitted by the emitter 162 over a range of viewing angles. Further, the smooth surfaces of the light guide 122 also help to maximize efficiency of the light guide, by reflecting a maximum amount of light upwards to the emitter 162. Textured or matted surfaces may absorb light from the light source 186, which can reduce the brightness and overall light emitted by the light guide 122.

In some embodiments, the light guide body 168 may be a separate component from the wall 160 and/or emitter 162. For example, the annular rib 164 may act to couple the components together, e.g., via welding, adhesive, mechanical connections, or the like. In other examples, the light guide body 168 and the emitter 162 may be mechanically separate from one another, but in optical communication, to allow the transmission of light therebetween.

In some embodiments, the light guide 122, the actuator 126, and the spring 150 may be connected together. For example, the actuator 126 and the spring 150 may be formed integrally with the light guide 122 (e.g., as a unitary part), such as via injection molding or the like. The seal 124 may be overmolded onto the spring 150, resulting in the light guide 122, the seal 124, the actuator 126, and the spring 150 being formed as a single part. The spring 150 may extend into a center of the light guide 122, and may be disposed in substantially the same plane as the annular rib 164. The actuator 126 may extend from a bottom surface of the spring 150 adjacent to and aligned with the shaft 152, but extending from the opposite side. By forming the components as a single piece, the manufacturing for the device 100 can be simplified and costs reduced. Additionally, the reliability and operational life of the various components can be extended as there are fewer moving parts.

With reference to FIGS. 6A and 7A, the button assembly 108 may be assembled by attaching the button seal 124 to the spring 150 (e.g., via an overmolding process) and coupling the button 120 to the spring 150. For example, the button 120 may be ultrasonically welded to the spring 150. In some embodiments, the button attachment shaft 152 may be inserted into the connection cavity 140 of the connection barrel 134. The keying features 154 of the button attachment shaft 152 may be aligned with a corresponding recess on the connection barrel 134 to orient the button 120 relative to the spring 150. After connection of the button 120 to the spring 150, the emitter 162 of the light guide 122 may surround a perimeter of the button 120 so as to illuminate the periphery of the button 120. In some embodiments, the emitter 162 is formed as a ring around the button 120.

Figures 5A, 5B:
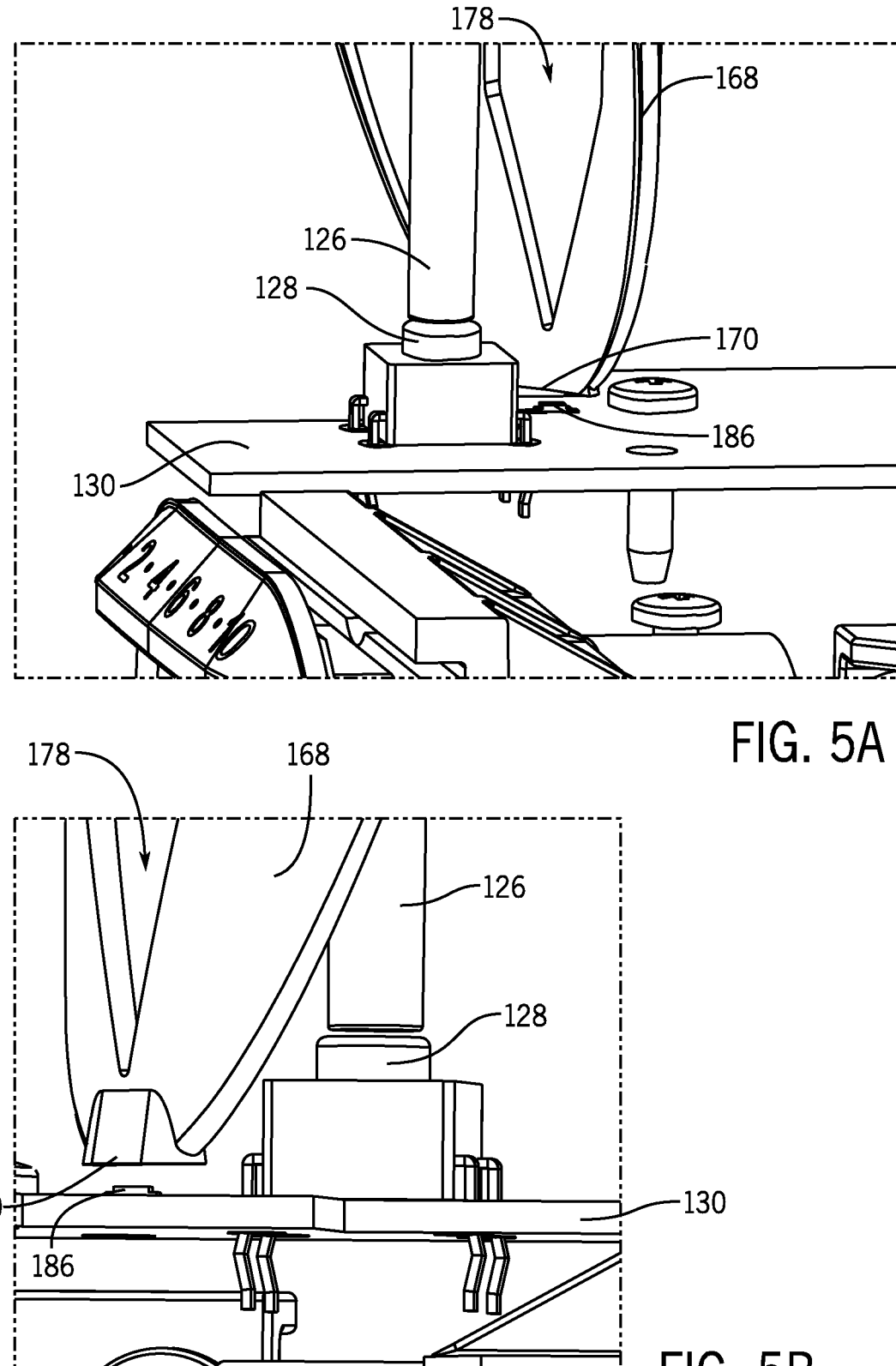
FIG. 5A is an enlarged view of FIG. 4.
FIG. 5B is an enlarged view similar to FIG. 5A, but as viewed from a rear of the oral irrigator.

With reference to FIGS. 4, 5A, and 5B, the button assembly 108 may be aligned relative to the base 112 such that the actuator 126 is positioned over the switch 128 and the light entrance 170 of the light guide 122 is positioned over and in optical communication with the light source 186. In this manner, light emitted from the light source 186 enters into the light guide body 168 by the light entrance 170. In some embodiments, the light source 186 is a single LED. In these embodiments, the light guide 122 transmits the light from the single LED in a passive manner to the emitter 162 to illuminate, for example, a periphery of the button 120. In some embodiments, the light source 186 may be two or more LEDs or other light emitting elements.

With reference to FIG. 6A, the button assembly 108 may be positioned within the device 100. The riser 110 may act to position and secure the button assembly 108 to the device 100. For example, the annular rib 164 of the light guide 122 may seat within a corresponding groove of the device 100 (such as the riser cover 182). The riser cover 182 may secure the button assembly 108 to the device 100. In some implementations, the riser cover 182 may secure the button assembly 108 to the base 112 via the riser 110. The annular rib 164 may include a keying feature (e.g., tab 166), which may seat within a corresponding keying element of the riser cover 182 to orient the button assembly 108 relative to the base 112. A portion of the button assembly 108 may be received within the riser cavity 184 defined by the riser 110.

A portion of the light guide 122 may optically couple the button assembly 108 to the light source 186. For example, the light entrance 170 of the light guide 122 may be positioned near the light source 186 to receive light from the light source 186. The light guide 122 may direct the light to the emitter 162 of the light guide 122.

A portion of the actuator 126 may mechanically couple the button assembly 108 to the switch 128. For example, a distal end of the actuator 126 may be disposed near the switch 128. Depression of the button 120 by a user may cause the actuator 126 to actuate the switch 128.

When assembled, the button assembly 108 acts to provide a visual output to the user by emitting light generated by the light source 186. For example, with reference to FIGS. 1, 5A, and 5B, when powered, the light source 186 generates light wavelengths. The light wavelengths enter into the light guide 122 at the light entrance 170. As shown in FIGS. 5A and 5B, the width of the light entrance 170 extends over the light source 186 to capture as much light as possible into the light guide 122. As the light is emitted from the light source 186, the total light is split into two portions, e.g., a first portion and a second portion, as the light travels within the light guide body 168 and reaches the bottom point of the fourth distribution cutout 178. In embodiments where the bottom end of fourth distribution cutout 178 is V-shaped, the light is directed to the right and left, respectively of the bottom point of the cutout 178, with the first and second light portions being equal to one another. The first and second portions of light then may travel within the body 168 diagonally upward (tracking the length of the tapered body), until reaching the other distribution cutouts 172a, 172b, 174a, 174b, 176a, 176b. At these distribution cutouts 172a, 172b, 174a, 174b, 176a, 176b, the terminal ends of the cutouts act to pull portions of the light and direct the portion upwards towards the emitter 162. The space of the light guide body 122 surrounding the distribution cutouts 172a, 172b, 174a, 174b, 176a, 176b, 178 act to define different emission portions or regions, which as the size of the cutouts vary, the emission portions vary correspondingly to ensure that larger emission regions are positioned further from the light source 186 to help ensure uniform illumination of the emitter 162.

The light wavelengths then travel into the extension wall 160, which may be textured, to further blend the light wavelengths together, and exit the light guide 122 via the emitter 162. The distorted light paths and variation in texture between the light entrance 170 and the light exit at the emitter 162 generates a uniform and blended light appearance, without hot spots or dark areas, even when the emitter 162 is viewed from multiple angles. With reference to FIG. 1, the emitter 162 is positioned around a perimeter of the button 120 creating a "glow" or otherwise aesthetically pleasing appearance that assists in identifying the button 120 to a user, which may be especially useful in low light environments or the like. In some embodiments, the light source 186 may also blink or otherwise change in frequency or color to indicate different information to the user, e.g., changes in mode, or the like.

It should be noted that the light guide 122 may be configured to illuminate the entire emitter 162 and area surrounding the button 120 uniformly with a single LED. Conventionally, multiple LEDs are required to uniformly illuminate a similarly shaped and sized button 120, which increases the expense of manufacture as well as can generate "hot spots" with the emitter 162.

The button 120 may move from a first or original position to a second or actuation position. With reference to FIGS. 1 and 6B, to actuate the switch 128, the user exerts a force F, which may be normal to the top surface 142 of the button 120. The force F, acts to deform the spring 150 and specifically, the spring arms 156a, 156b, as the connection of the button 120 to the spring 150, transmits the force F to the spring 150. As the spring arms 156a, 156b deflect, e.g., move downward, the button seal 124 moves therewith, maintaining a liquid-tight seal and preventing liquid (e.g., water) from passing around the button 120 into the base 112.

The deflection of the spring arms 156a, 156b, cause the actuator 126, which is coupled to the spring arms 156a, 156b, to move correspondingly, e.g., in a downward direction, parallel with the force F. As the actuator 126 moves, the gap between the bottom end of the actuator 126 and the switch 128 closes, and the actuator 126 mechanically compresses the switch 128, to change the state of the switch 128. In one example, the switch 128 is coupled to an electrical circuit that provides power to the device 100, such that when the switch 128 is first activated, the switch 128 completes the circuit and activates the device 100, and then when the switch is activated again to a second state, the switch 128 disconnects the circuit, deactivating the device 100. However, in other embodiments, the switch 128 may be activated in other means and a mechanical connection may be not be required.

After the user force F is removed or ceases, the spring arms 156a, 156b return to their original position, e.g., moving upwards towards the riser cover 182, causing the actuator 126 to move therewith. As the spring arms 156a, 156b move, the button 120 also moves therewith to return the button to the first or original position.

All relative and directional references (including top, bottom, side, front, rear, and so forth) are given by way of example to aid the reader's understanding of the examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims.

The present disclosure teaches by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A light guide comprising:
an emitter; and
a light guide body optically coupled to the emitter, wherein the light guide body defines a cylindrical body with one or more sidewalls, wherein the cylindrical body taper along an angled plane from a top end towards a bottom end, the bottom end defining a light entrance to the light guide body, the light guide body further comprising a distribution cutout defining an opening entirely through the one or more sidewalls of the light guide body.

2. The light guide of claim 1, wherein the angled plane is selected such that the light guide body directs light from a first side of the light guide body towards a second side of the light guide body opposite of the first side, wherein the light entrance is on the first side of the light guide.

3. The light guide of claim 1, wherein the distribution cutout comprises a tapered end facing the light entrance, the tapered end is configured to split light emitted from a light source entering the light entrance into a first light portion and a second light portion.

4. The light guide of claim 3, wherein the first light portion and the second light portion are equal to one another.

5. The light guide of claim 1, wherein the distribution cutout comprises a plurality of distribution cutouts defined by the light guide body, wherein the plurality of distribution cutouts create emission regions within the light guide body that are smaller closer to the light entrance and that are larger farther from the light entrance.

6. The light guide of claim 5, wherein the plurality of distribution cutouts comprise:
a first set of distribution cutouts having a first size and defining a first emission region; and
a second set of distribution cutouts having a second size and defining a second emission region, wherein
the first size is larger than the second size; and
the second set of distribution cutouts is positioned closer to the light entrance than the first set of distribution cutouts.

7. The light guide of claim 1, wherein:
the emitter comprises a first texture on an outer surface; and
the light guide body comprises a second texture on an outer surface, the second texture being different from the first texture.

8. The light guide of claim 1, wherein the one or more sidewalls of the light guide body are curved to define a hollow internal space extending along the entire length of the light guide body, wherein light from the emitter travels through the one or more sidewalls of the light guide body as it extends from the bottom end to the top end.

9. The light guide of claim 1, wherein the light guide body is formed of transmissive plastic.

10. The light guide of claim 1, wherein the cylindrical body and distribution cutout uniformly reflect and distribute light from the light entrance as the light is transmitted to the emitter.

11. The light guide of claim 1, wherein the light guide body has a first texture along a first length and a second texture, different from the first texture, along a second length.

12. The light guide of claim 11, wherein the first texture is a smooth texture and the first length is a bottom portion of the light guide body and the second texture is a rough texture and the second length is a top portion of the light guide body.

13. A light guide comprising:
an emitter; and
a light guide body optically coupled to the emitter, wherein the light guide body defines a cylindrical body that tapers along an angled plane from a top end towards a bottom end, the bottom end defining a light entrance to the light guide body, and comprises a plurality of distribution cutouts defined by the light guide body, wherein the plurality of distribution cutouts define emission regions within the light guide body that are smaller closer to the light entrance and that are larger farther from the light entrance.

14. The light guide of claim 13, wherein the plurality of distribution cutouts comprise:
a first set of distribution cutouts having a first size and defining a first emission region; and
a second set of distribution cutouts having a second size and defining a second emission region, wherein
the first size is larger than the second size; and
the second set of distribution cutouts is positioned closer to the light entrance than the first set of distribution cutouts.

* * * * *